UNITED STATES PATENT OFFICE.

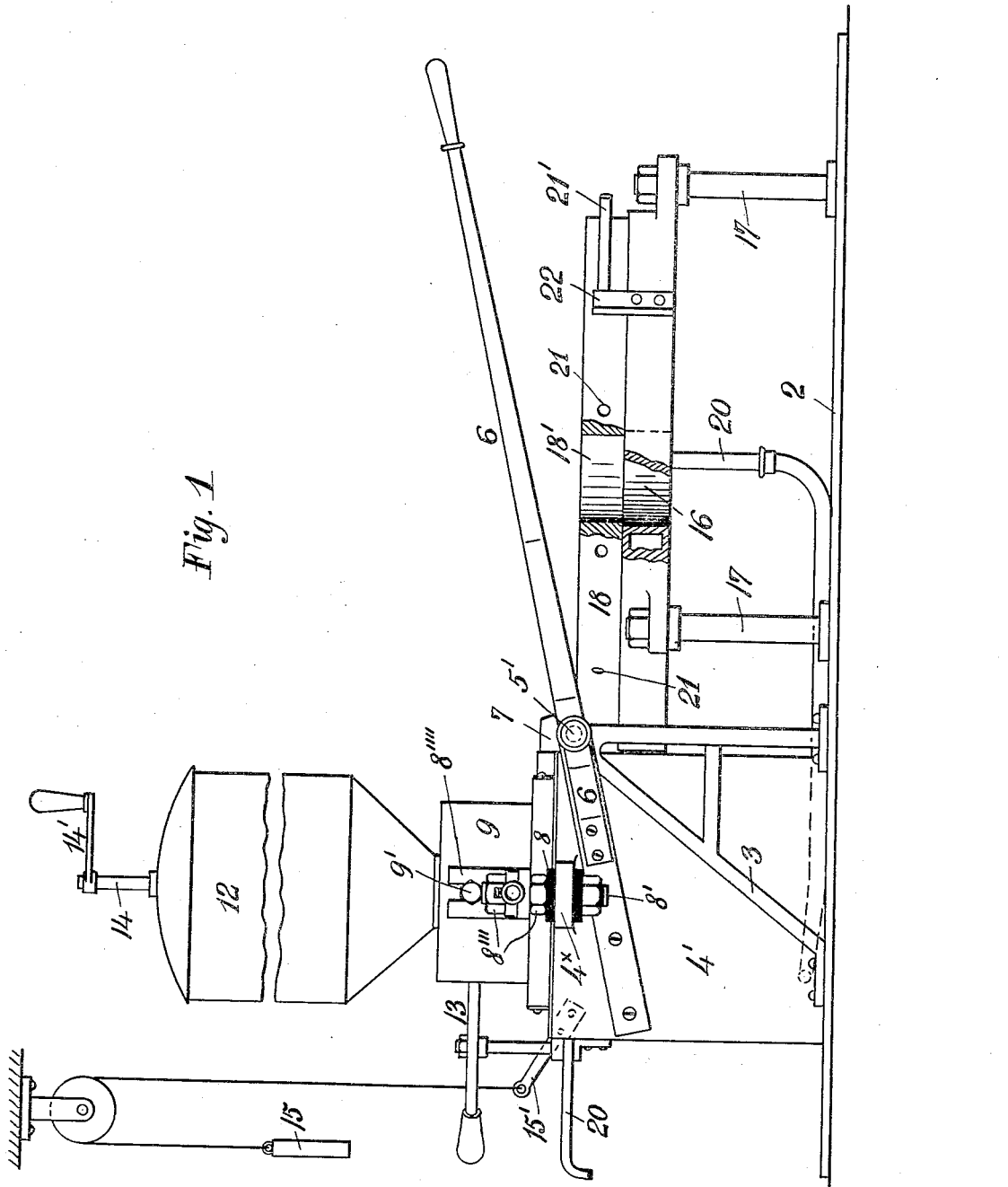

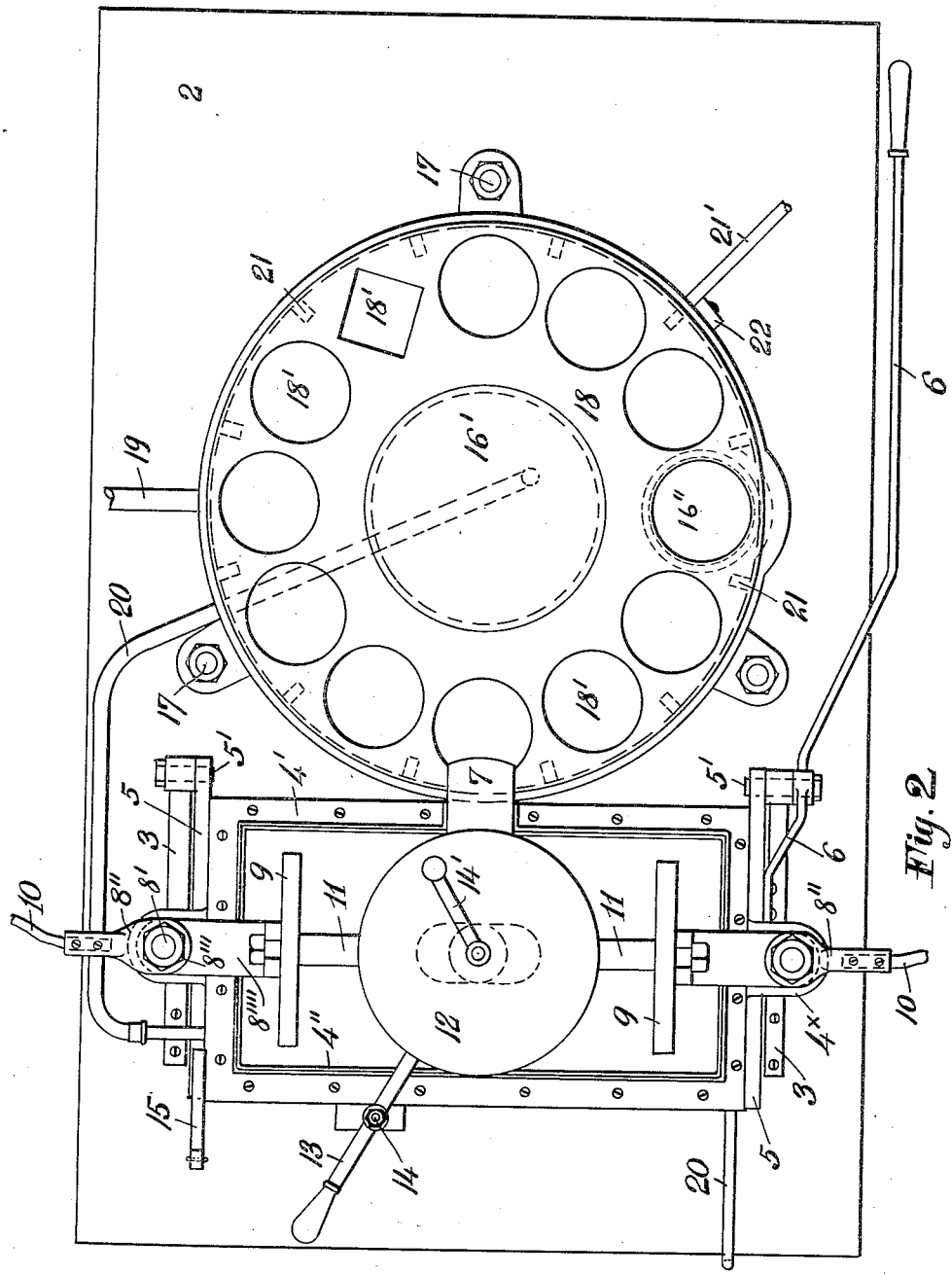

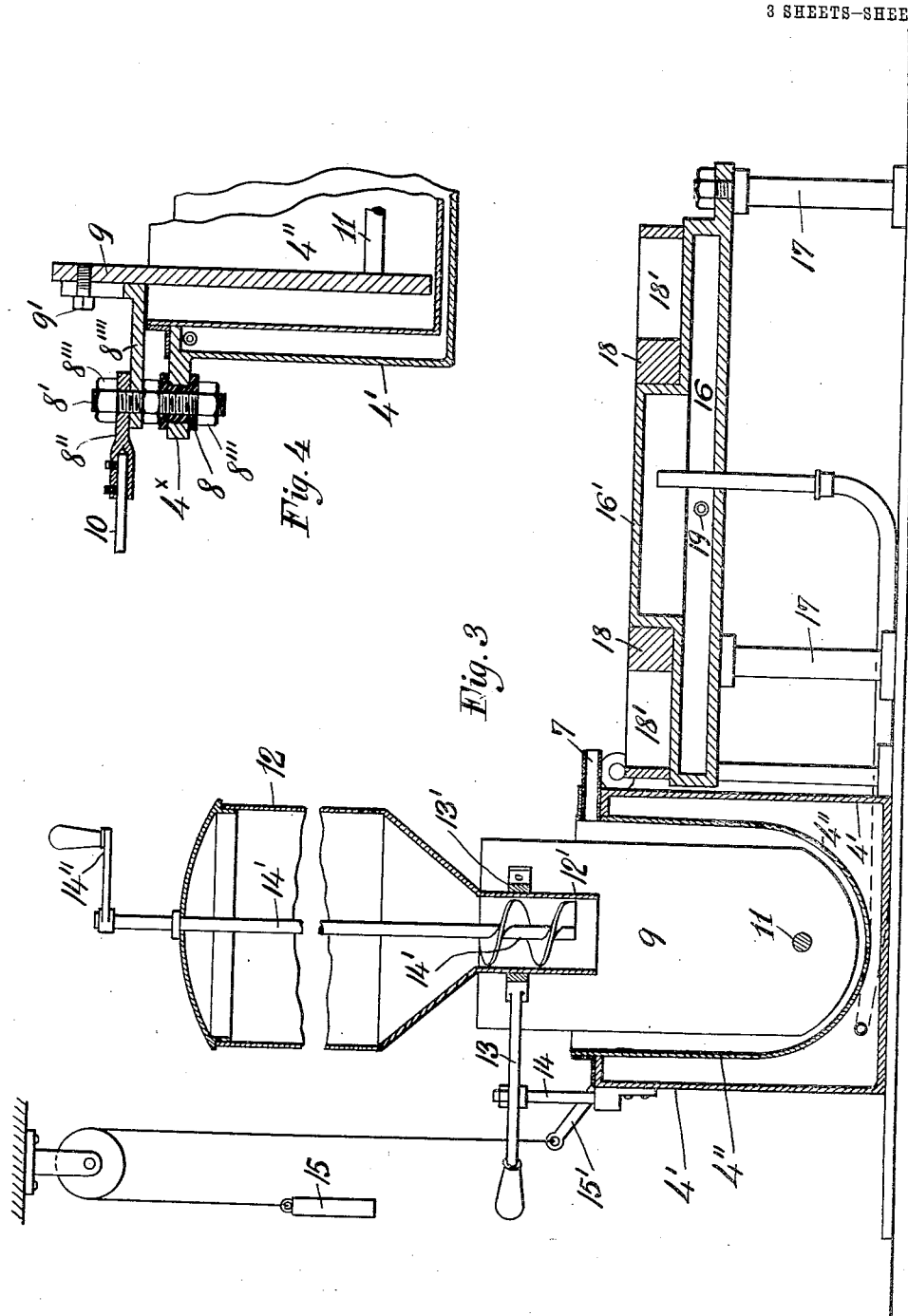

GEORGE FRED BRINDLEY, OF SAN FRANCISCO, CALIFORNIA, ASSIGNOR TO THE ROESSLER & HASSLACHER CHEMICAL COMPANY, OF NEW YORK, N. Y., A CORPORATION OF NEW YORK.

APPARATUS FOR PREPARING OXONE.

1,028,857.  Specification of Letters Patent. Patented June 11, 1912.

Application filed February 17, 1909. Serial No. 478,508.

*To all whom it may concern:*

Be it known that I, GEORGE FRED BRINDLEY, a subject of the King of Great Britain, and a resident of San Francisco, California, have invented certain new and useful Improvements in Apparatus for Preparing Oxone, of which the following is a specification.

My invention relates to an electrical furnace for preparing the product called oxone, wherein the peroxid forming the base of that substance may be melted and otherwise treated so that it may be turned out in the form of cakes ready for commercial use.

Peroxids are sources of active oxygen. Oxone is a product which is formed by fusing certain peroxids, preferably the peroxid of sodium, which is then capable of generating oxygen gas in the presence of moisture. It is for the purpose of preparing this fused peroxid of sodium, which has been named "oxone" that I have devised the process and apparatus herewith described and illustrated.

The accompanying drawings illustrate an apparatus wherein the powdered peroxid is fused into cakes of oxone, in shape for immediate use.

Figure 1 is a side elevation of my apparatus. Fig. 2 is a plan view thereof. Fig. 3 is a diametrical vertical section through the peroxid container and distributer, the fusing tank and the rotary molds. Fig. 4 is an enlarged detail of one of the electrode supports.

In all the drawings, like numerals designate like parts.

Broadly, the process for the production of "oxone" consists in submitting powdered peroxid of sodium to the action of an electric current for which it forms the conductor, raising the temperature of the peroxid to a melting point by the passage of an electric current, and then pouring the melted material into suitable molds, where it is rapidly cooled; and the apparatus, broadly considered, comprises a ladle, electrodes dipping into the ladle, a temporary removable metallic resistance between the electrodes and means for pouring the melted peroxid from the ladle.

The apparatus which I have found best adapted to carry out my process consists broadly of a ladle into which is dipped electrodes having conducting wires connecting them for electrically heating the peroxid to the proper temperature and chilling molds into which the fused product from the ladle is poured.

2 designates any suitable base on which the machine is mounted and 3, upright standards of any convenient construction carrying at their upper ends bearings for the trunnions of the melting pot or ladle. The ladle is in the form of a water-bath; that is having double walls, formed by an outer casing 4′ and an inner bowl 4″, and is preferably rectangular in plan. The outer casing of the ladle is provided at its ends with the braces 5, whose ends project beyond the front of the ladle and are provided with the trunnions 5′ which are supported on the standards 3 and on which the ladle turns. A forwardly projecting lever 6 is pivoted on one of the trunnions 5′, the rear end of the lever being rigidly attached to the end of the casing preferably by attaching it to the brace 5. The object of the lever is to tip the ladle on its trunnion; and though the construction I have shown is convenient, I, of course, need not be limited thereto as the lever may be attached to the ladle in any other desired manner without departure from my invention, it being only necessary that the lever shall be capable of tipping the ladle and shall be properly proportioned to that end. In order that the lever may escape the edge of the base I have bent it outwardly beyond the said base, as shown clearly in Fig. 2.

The top edges of the outer casing 4′ have rearwardly turned flanges which center and support the bowl 4″ of the ladle. Preferably this bowl is made of copper,—glass or material of that nature being liable to crack, and iron or steel being subject to be chemically acted upon by the peroxid. At the front of the ladle is a nozzle or lip 7 of copper which projects out some distance beyond the face of the ladle. This nozzle is preferably covered so as to prevent all splashing of the molten material as it is poured into the molds.

Fig. 4 shows a sectional end view of the ladle in order to illustrate in detail the method of attaching the electrodes. To this end the outer casing 4′ at its end at about the middle of its top is provided with an outwardly extending lug $4^x$, carrying a bushing 8 of insulating material. Passing through this bushing and supported therein is a bolt 8' which in turn supports a binding screw contact piece 8'' of copper. Nuts 8''', 8''' on either side of the bushing 8 hold the bolt rigidly in position. In contact with the contact piece 8'' is a copper electrode support 8'''' which extends inwardly beyond the inner face of the bowl 4', and attached to said contact piece by a screw 9' is an electrode 9, which may be of copper, steel or any other suitable conducting material. It will be seen from Fig. 4 that the electrode support 8'''' is bent upward at its end and that the turned up portion is slotted for the passage of the bolt 9'. This allows the electrode 9 to be adjusted vertically to any desired position in the pawl.

10 designates a conducting wire carrying the electric current to the electrode and held in the binding post 8'' by set screws supported between the electrodes 9 so as to form an electrical connection from one electrode to the other. Near the bottom of the bowl 4'' is a resistance 11 of steel.

Supported above the bowl and at a position between the two electrodes is a hopper 12 from which the powdered peroxid of sodium is distributed into the bowl of the ladle. This hopper should be removable from above the ladle so as to admit of the ladle being tipped upon its trunnions, and to that end I support it on a lever 13 which is pivoted on an upwardly projecting arm 14, riveted to the rear of the outer casing 4'. The end of the arm forms a ring 13' which encircles the lower tubular end 12' of the inverted cone-shaped hopper 12. Passing centrally downward through the hopper is the shaft 14' having at its upper end above the removable top of the hopper, a crank handle 14''. The lower end of the shaft is central in the tubular portion 12' of the hopper and there carries a helix or screw plate designed to feed the powdered peroxid downward.

In order that the peroxid may be distributed more evenly across the entire length of the bowl between the electrodes, I preferably flare the lower tubular end below the distributer shaft 14', said flare being in the direction of the length of the bowl. Thus the material is more evenly spread between the electrodes than it would be if the end of the hopper was merely tubular. After the hopperful of material has been distributed into the bowl of the ladle and the peroxid in the said bowl has been melted or fused, the hopper 12 is moved out of the way by turning the lever 13 and the ladle may be then tipped upon its trunnions in order to pour the molten peroxid into the molds. As the ladle and the molten material are heavy, it is best that the ladle should be counterbalanced, to which end I have provided the weight 15 attached to a suitable cord fastened over a pulley and down to an arm 15' projecting outward from the outer casing of the ladle.

In order that the melted peroxid may be solidified into cakes and taken rapidly from the machine, I provide in conjunction with my melting pot a rotatable mold table and cooling apparatus, the molds of which are adapted to be brought successively beneath the spout 7, filled and rotated to a position over an opening through which the oxone cake may be dropped into any suitable receptacle. To this end I provide a hollow table 16 supported on suitable legs 17, this table being fixed and its circumference projecting slightly under the projecting end of the spout 7. The center of the table is raised to form a hub 16' which engages with a rotatable mold ring 18. The upper face of the table 16, as will be noted, forms the bottom of the molds, the sides of the molds being formed by the rotatable ring 18. This ring is cut out to form the molds 18'; the sides of each mold being slightly cone-shaped upwardly so as to allow a cake formed within one of the molds to drop through the opening 16'' formed in the table 16 and with which the molds 18' are adapted to register, as the mold ring is turned around. This opening, it will be of course understood, is greater in diameter than the diameter of any one of the mold rings. In Fig. 2 I have shown a square opening. This is merely to indicate that I may make the molds of any desired shape. A pipe 19 admits water to the interior of the hollow table 16, thus keeping the bottoms of the molds cool and tending to solidify the molten peroxid.

20 is an outlet pipe which takes the warm water and leads it to the water jacket of the melting pot formed by the walls 4' 4''. A pipe 20' carries off the water from the water jacket to any suitable wasteway.

In order that the molds may be turned to bring them into exact register with the spout 7, I provide the circumference of the mold ring with sockets 21 in which a pin 21' may be inserted. A stop 22 fast on the circumference of the table 16 is adapted to contact with the handle pin 21' to stop the rotation of the mold ring when any one of the molds is exactly beneath the spout 7.

The operation of my invention is as follows: The current used in melting the peroxid is alternating and I use a current from a suitably regulated transformer for that purpose. The peroxid is placed in the hopper 12 in the form of a powder the hopper being closed in order that the peroxid may be kept from contact with the air as much as possible, as otherwise it decomposes. The furnace is started by passing a current of electricity through the electrodes and through the resistance 11. The peroxid is sifted gradually into the melting pot until the resistance 11 is covered, care being taken that the peroxid is not put in too rapidly as it reduces the current until it is melted. When the bottom of the melting pot and the resistance are covered with peroxid the heat generated by the electricity passing through the resistance melts the peroxid, which thus becomes a conductor of electricity on its own account. After enough peroxid is melted to form a bath which will carry electricity in sufficient quantities, the resistance 11 may be dispensed with, the peroxid simply being sifted in as it is needed. When the peroxid has reached the proper degree of heat and is uniformly melted so that it can flow easily the melting pot is then tipped by depressing the lever 6 and the molten material passes out into the molds, as the latter are rotated. As the oxone is in contact with the upper face of the water jacketed table, it will in a short time solidify sufficiently so that the cake will drop through the opening 16″ of the table.

Oxone, the product of the above described apparatus, is solid, easily transportable, and conveniently handled. One pound of oxone furnishes about 2.15 cubic feet of oxygen gas. "Oxone" has small volume and the oxygen gas given off thereby equals three hundred and twelve times the volume of the oxone itself. It may be used in medical practice, for regenerating the air in submarine vessels, or for any purpose for which oxygen itself may be used.

Having described my invention what I claim is:

1. An apparatus for preparing oxone from peroxid of sodium comprising a melting pot, electrodes dipping into said pot, a resistance connecting said electrodes and located within the said pot, means for connecting said electrodes to a source of electrical energy, standards on which the melting pot is pivoted, a hopper supported above said melting pot, said hopper support being adapted to be turned from a position above the melting pot to a position beyond the same.

2. An apparatus for preparing oxone from peroxid of sodium, comprising a melting pot, electrodes dipping into said pot, a resistance connecting said electrodes and located within the said pot, means for connecting said electrodes to a source of electrical energy, standards on which the melting pot is pivoted, a hopper shiftably supported above the said melting pot for containing the said peroxid and having a distributing nozzle at its lower end, a cover for closing the upper end of said hopper, a shaft passing through the said hopper and into the nozzle, and a crank on said shaft, and a screw feed on said shaft for feeding the peroxid to the melting pot.

3. An apparatus for preparing oxone from peroxid of sodium, comprising a horizontally pivoted bowl-shaped melting pot open at its top, standards for supporting said melting pot upon its bearings, means attached to the ends of said pot for supporting electrode connections, electrodes therein supported but insulated from the pot and dipping down into the bowl of the pot, connections from said electrodes to a source of electrical energy, means for swinging said pot upon its pivots to pour out the molten mass, a closed hopper shiftably supported above the melting pot for containing the peroxid to be melted, said hopper being capable of being turned from a position above the melting pot to a position beyond the same.

4. An apparatus for preparing oxone from peroxid of sodium, comprising a double walled melting pot having a water space between the walls, horizontal bearings on which said melting pot may turn, projecting lugs on the ends of said melting pot, bolts supported in said lugs but insulated therefrom, an electrical connection attached to each of said bolts projecting over the melting pot and having slotted upturned ends, electrodes connected to said upturned ends and shiftable up and down in said slots and projecting downward into the bowl of the pot, a removable conductor between the said electrodes and having close electrical connection therewith, and connections from said electrodes to a source of electrical energy.

5. An apparatus for preparing oxone from peroxid of sodium, comprising a pivoted melting pot, an outer casing inclosing the same, and forming a watering jacket therefor, an inner bowl of copper supported within the outer casing, a covered lip on said inner bowl projecting beyond said outer casing, electrodes supported on the casing and dipping into the pot, a conductor between and having close electrical connection with said electrodes, but removable therefrom and located within the said bowl, an electrical connection from a source of energy to said electrodes, a horizontally movable lever pivoted on said outer casing and supporting at its end above the bowl a hopper for the peroxid, a shaft within said hopper having a feed screw thereon for feeding the peroxid into the melting pot and a lever attached to the outer casing of the pot whereby the pot may be turned upon its bearings.

In testimony whereof I have signed this specification in the presence of two subscribing witnesses.

GEORGE FRED BRINDLEY.

Witnesses:
K. G. LE ARD,
SEABURY C. MASTICK.